US010492465B2

(12) United States Patent
Van Den Berg

(10) Patent No.: US 10,492,465 B2
(45) Date of Patent: Dec. 3, 2019

(54) METHOD FOR DISTRIBUTING FEED OVER A PLURALITY OF SEPARATE FEEDING LOCATIONS AND A FEEDING SYSTEM THEREFOR

(71) Applicant: LELY PATENT N.V., Maassluis (NL)

(72) Inventor: Karel Van Den Berg, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 552 days.

(21) Appl. No.: 15/032,268

(22) PCT Filed: Sep. 29, 2014

(86) PCT No.: PCT/NL2014/050664
§ 371 (c)(1),
(2) Date: Apr. 26, 2016

(87) PCT Pub. No.: WO2015/065171
PCT Pub. Date: May 7, 2015

(65) Prior Publication Data
US 2016/0249585 A1    Sep. 1, 2016

(30) Foreign Application Priority Data

Nov. 1, 2013  (NL) .................................... 2011722

(51) Int. Cl.
*A01K 5/02*   (2006.01)

(52) U.S. Cl.
CPC .............. *A01K 5/0275* (2013.01); *A01K 5/02* (2013.01); *A01K 5/0266* (2013.01); *A01K 5/0283* (2013.01); *A01K 5/0291* (2013.01)

(58) Field of Classification Search
CPC ...... A01K 5/02; A01K 5/0275; A01K 5/0266; A01K 5/0283; A01K 5/0291
See application file for complete search history.

(56) References Cited

U.S. PATENT DOCUMENTS

| 5,424,957 A | * | 6/1995 | Kerkhoff | A01K 5/02 |
| | | | | 119/51.02 |
| 10,172,322 B2 | * | 1/2019 | Ruizenaar | A01K 5/02 |
| 2002/0157614 A1 | * | 10/2002 | Shin | A01K 5/002 |
| | | | | 119/57.4 |

FOREIGN PATENT DOCUMENTS

| DE | 3438612 A1 | * | 4/1986 | .......... A01K 5/0266 |
| NL | 2008185 C | | 7/2013 | |

(Continued)

OTHER PUBLICATIONS

"Lely Vector automatic feeding system—How It Works," available at https://www.youtube.com/watch?v=Asga34qI9IM (Year: 2012).*

(Continued)

*Primary Examiner* — Lisa L Tsang
(74) *Attorney, Agent, or Firm* — Birch, Stewart, Kolasch & Birch, LLP

(57) ABSTRACT

A method for distributing feed over multiple separate feeding locations includes determining which feeding locations have a feed requirement; determining a priority for the feeding locations having a feed requirement, wherein a first feeding location has the highest priority; determining a feed composition and a first amount to be delivered to the first feeding location; determining a maximum filling amount of a feed delivery device; determining a remaining filling amount by subtracting the first amount from the maximum filling amount; determining which feeding locations have a feed requirement and require the same feed composition; apportioning at least a part of the remaining filling amount over one or more of the determined feeding locations; and filling the feed delivery device.

24 Claims, 2 Drawing Sheets

(56) References Cited

FOREIGN PATENT DOCUMENTS

Figure 1:
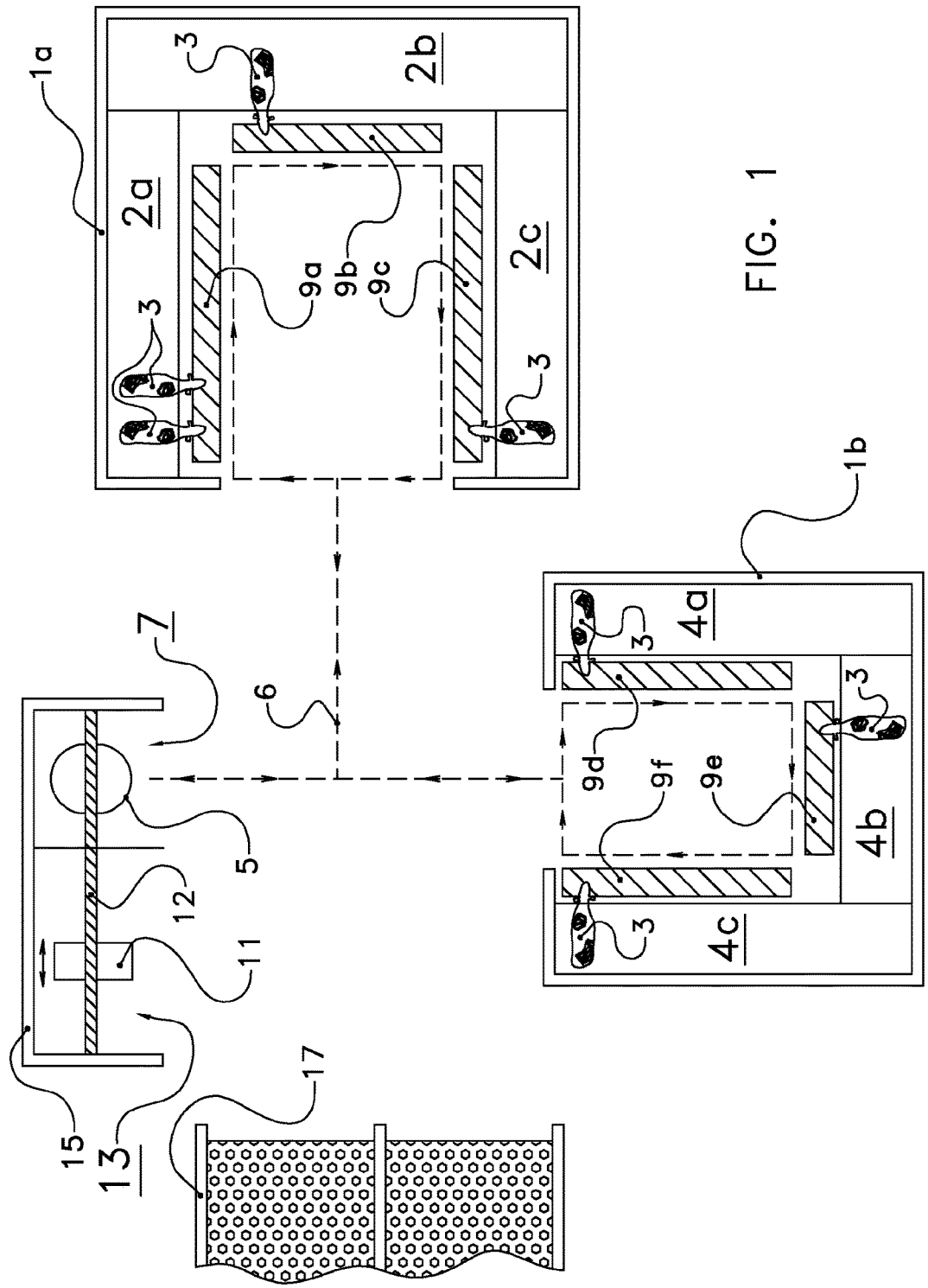
Figure 2:
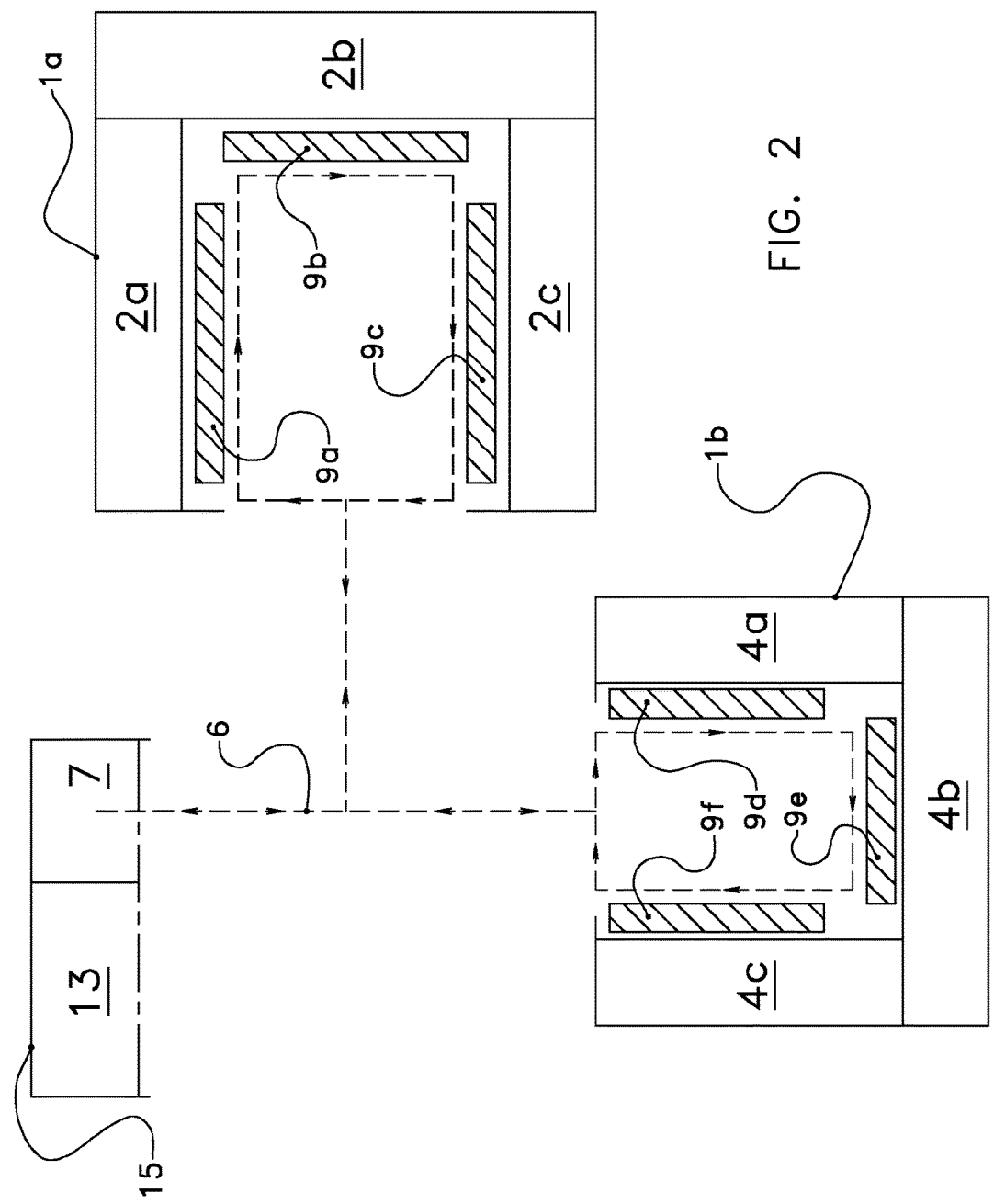

| WO | WO-2005067704 A1 * | 7/2005 | ............... A01K 5/02 |
| WO | WO 2008/097080 A1 | 8/2008 | |
| WO | WO 2008/123820 A1 | 10/2008 | |
| WO | WO-2011091294 A1 * | 7/2011 | ............... A01K 5/00 |

OTHER PUBLICATIONS

"Lely Vector—Experience (English)," available at https://www.youtube.com/watch?v=zY5YTVI50Mk (Year: 2012).*
Lely: "Lely Vector Brochure", pp. 1-24, XP002726888, Retrieved from the Internet: URL:http://www.lely.com/en/feeding/automatic-feeding-system/vector [retrieved on Jul. 9, 2014], the whole document.

* cited by examiner

METHOD FOR DISTRIBUTING FEED OVER A PLURALITY OF SEPARATE FEEDING LOCATIONS AND A FEEDING SYSTEM THEREFOR

The invention relates to a method for distributing feed over a plurality of separate feeding locations.

In a farm, e.g. a dairy farm, taking care of feeding the animals, i.e. the cows, is an important daily routine. This daily routine takes a lot of time when performed by a person. In order to save time and effort for the farmer, automatic feeding systems like the Lely Vector™ automatic feeding system may be used which, when employed, takes care of most tasks within the routine.

Current automatic feeding systems are programmed to autonomously determine when to distribute feed to a feeding location. Each feeding location is assigned an associated feed composition, or mixed feed ration, which may vary from feeding location to feeding location depending on the corresponding type of animals that are fed at that feeding location. The system thus requests feed of a specific feed composition depending on the feed location to be provided with feed. A particular amount of feed with the required feed composition corresponding to the feed requirement of said feeding location is then loaded in a feed delivery device and subsequently delivered and distributed over said feeding location.

Although such systems work fine to automatically prepare feed to be delivered to the animals without the constant assistance of a farmer, it has been found that sometimes the feed composition differs from the required feed composition. As the feed composition is very important for the well-being of animals and milk production of dairy animals, it is desired that the actual prepared and delivered feed composition is according to the recipe or close to it.

It is thus an object of the invention to improve the feed composition prepared and delivered to a feeding location.

This object is achieved by providing a method according to claim 1, in particular a method for automatically distributing feed over a plurality of separate feeding locations using a feed delivery device, comprises the following steps:
a) determining which feeding locations have a feed requirement;
b) determining a respective feed distributing priority for the feeding locations having a feed requirement, wherein a first feeding location is the feeding location having the highest priority;
c) determining a first feed composition and a first amount to be delivered to the first feeding location;
d) determining a maximum filling amount of the feed delivery device for the first feed composition;
e) determining a remaining filling amount of the feed delivery device for the first feed composition by subtracting the first amount from the maximum filling amount;
f) apportioning at least a part of the remaining filling amount to a second feeding location having a feed requirement of the first feed composition;
g) filling the feed delivery device with the first amount and said part of the remaining filling amount;
h) distributing the first amount and said part to the first feeding location and the second feeding location, respectively.

By applying these steps the feed delivery device is filled with feed of a particular composition and delivers said feed to more than one feeding location. The invention is based on the insight of the inventors that the difference between in a feed composition which actually is delivered and the feed composition which was required in particular occurs when the to be prepared amount of the feed composition is low. This happens for so-called small feeding locations where not a lot of animals are present. In such a case the different ingredients making up the feed composition are to be loaded in such small sub-amounts that the required accuracy cannot be met, causing the deviation from the prescribed sub-amounts per ingredient and resulting in a different prepared feed composition. By combining the amounts of a particular feed composition to be distributed to several feeding locations, it is no longer necessary to separately prepare and deliver that particular feed composition in small amounts to small groups of animals, but rather it is possible to prepare a total amount of the feed composition which is bigger and allows to more accurately dose the sub-amounts of individual feed ingredients.

Another advantage of the method according to the invention may be that the operating costs are lowered as there are less required feed distributing rounds per time frame due to delivering feed to more than one feeding location at a time, i.e. per feeding distributing round.

A further advantage of the method according to the invention may be that when mixing is required, the mixing can be performed better, i.e. results in a more homogeneous mixed ration. This is caused by the fact that for good mixing not only the mixing time is important, but also the amount to be mixed. For good mixing each feed mixing device requires a minimum amount of feed. By preparing feed to be delivered to more than one feeding location, it is more likely that this minimum amount of feed is exceeded.

In an embodiment, the apportioning step f comprises the following steps:
f1) selecting as the second feeding location a feeding location having a feed requirement of a second amount which second amount is less than or equal to the remaining filling amount,
f2) setting said part of the remaining filling amount to be the second amount.

In this way it is ensured that the selected second feeding location can get the complete amount of feed to be delivered to said second feeding location and not a part thereof while also ensuring that the maximum filling amount is not exceeded. This also means that if there is no second feeding location with an amount to be delivered that is below the remaining filling amount, only feed may be delivered to the first feeding location. So, the method tries to combine feeding locations in a feeding round, but will only deliver the first amount to the first feeding location when combining feeding locations is not possible. Combining is deemed not possible, if a combination of the amounts of the first and the second feeding locations, results in a total amount exceeding the maximum filling amount of the feed delivery device for that feed composition. The method ensures that the feed location with the highest priority will always be fed.

In an embodiment, the apportioning step (f) further comprising the following step to be carried out after step f2):
f3) updating the remaining filling amount to an updated remaining filling amount by subtracting the second amount of the current remaining filling amount,
and wherein
wherein the apportioning step (f) is repeated for further feeding locations having a feed requirement of the first feed composition with further amounts and further updated remaining filling amounts until there are no further feeding locations left which require a further amount of feed that is equal to or less than the part of the further updated remaining filling amount.

In other words, after the second feeding location is selected to be provided with feed in the same feeding round as the first feeding location, the method checks whether there is still a filling amount available in the feed delivery device for another feeding location. If this is the case, another feeding location is selected as well to receive feed in the same feeding round as the first feeding location, and if not the method continues to preparing the total amount of feed to be delivered to the first and second feeding locations. An advantage thereof is that method provides steps to maximize the accuracy of the prepared feed composition as well as minimizing the operating costs.

In an embodiment selecting the second or further feeding locations is done in descending order of feed distributing priority. Hence, in practice this may result in evaluating the feeding locations in descending order of priority and selecting the second feeding location only when the amount to be delivered to the second feeding locations is at most the remaining filling amount. When said amount is above the remaining filling amount, the second feeding location is discarded and a further feeding location with the next feed distributing priority is evaluated. This further feeding location is selected only if the amount to be delivered to this further feeding location is at most the remaining filling amount. Evaluating of second and further feeding locations may be stopped when the remaining filling amount is zero or below a predetermined value. An advantage of evaluating the feeding locations in descending order of priority is that the method aims to service feeding locations with a high priority earlier than feeding locations with a low priority.

In an embodiment, determining which feeding locations have a feed requirement is based on a rest feed measurement which is representative for the amount of feed remaining at a respective feeding location. An advantage thereof is that feed is only delivered to a feeding location when actually required instead of being determined on a predetermined average feed demand of the animals which is distributed in portions to the animals during a day, and which may lead to empty feeding locations or too much feed at a feeding location.

Rest feed measurements can be done by weight sensors in connection to a feeding location, with feed height sensors in connection to a feeding location or in connection to a feed delivery device, by 3D camera in connection to a feeding location or in connection to a feed delivery device, or other suitable sensor devices in connection to a feeding location or in connection to a feed delivery device or even by a person taking note of the remaining feed at the feeding locations.

In an embodiment, determining which feeding locations have a feed requirement comprises comparing the values of the rest feed measurement with a threshold value representative for a minimum amount of feed, wherein a feeding location is determined to have a feed requirement when the value of the rest feed measurement for said feeding location is below the threshold value corresponding to said feeding location. For instance, the rest feed measurement may result in an average feed height along the feeding location, e.g. in centimeters, wherein the threshold value may be a minimum average feed height. An advantage of using a minimum average feed height is that is can easily be ensured to distribute fresh feed often during the day, and the amounts to be distributed can be relatively small.

In an alternative embodiment, determining which feeding locations have a feed requirement is not based on a rest-feed measurement but is based on a pre-programmed feeding distribution plan, which indicates to which feeding location, which feed composition and amount must be distributed and the timing thereof over 24 hours, e.g. pre-programmed number of feed distribution runs with a feed distributing interval of a pre-determined number of hours between each run.

Advantageously, the method provides for determining the respective feed distributing priority for the feeding locations which allows to determine to which feeding locations feed is to be delivered.

Priority may be assigned based on the pre-programmed feeding distribution plan and feed distributing intervals, e.g. by determining at what point in time the previous feed delivery was carried out at that particular feed location in combination with an amount distributed and a total amount to be distributed. The total amount to be distributed may be determined based on the number and type of animals at that feeding location. E.g. it is known how much of a particular feed composition high-productive dairy cows need to eat per 24 hours and this amount may be preprogrammed to be distributed 4-6 times daily. For other type of animals, similar distribution plans may be made.

Alternatively, the feed distributing priority to be assigned may be based on rest feed measurements at the respective feed locations. It is then determined when a feed delivery needs to take place, and each feed delivery may be a predetermined amount of a feed composition. In particular, when using rest feed measurements, the feeding location having the largest difference between the respective rest feed measurement and the corresponding threshold value, i.e. the largest deficit, will be assigned the highest priority.

In an embodiment, the feed composition of the feed used to fill the feed delivery device is adapted based on a difference between the feed composition delivered earlier to a compensation feeding location and the desired feed composition to be delivered to the compensation feeding location, wherein the compensation feeding location is the location to receive the largest amount of feed from the feed delivery device, and wherein the adaptation of the feed compensation is intended to compensate for said difference. Hence, an advantage is that deviations from the prescribed sub-amounts per ingredient are compensated in a next feed delivery.

In an embodiment, the feed delivery device moves along a route past all feeding locations when distributing the feed, wherein the feeding locations are grouped depending on obstacles present along the route that may interfere with the feed delivery device during distributing the feed, and wherein in step f) only the further feed locations are determined which also belong to the same group as the first feeding location. In this way, the distribution of the feed is finished before the obstacle is met along the route, so that the chance of interference between the feed delivery device and the obstacle are minimized.

The invention also relates to a feeding system in accordance with claim 11, in particular a feeding system for automatically distributing feed over a plurality of separate feeding locations, comprising:
1. a feed delivery device;
2. a feed storage location;
3. a feed loading location;
4. a feed preparation device; and
5. a control unit, wherein the feed delivery device is configured to automatically deliver feed from the feed loading station to at least one feeding location, wherein the feed preparation device is configured to deliver feed from the feed storage location to the feed loading location to fill the feed delivery device,
and wherein the control unit is configured to:
   a) determine which feeding locations have a feed requirement;
   b) determine a respective feed distributing priority for the feeding locations having a feed requirement, wherein a first feeding location is the feeding location having the highest priority;
   c) determine a first feed composition and a first amount to be delivered to the first feeding location;
   d) determine a maximum filling amount of the feed delivery device for the first feed composition;
   e) determine a remaining filling amount for the first feed by subtracting the first amount from the maximum filling amount;
   f) apportion at least a part of the remaining filling amount to a second feeding location having a feed requirement of the first feed composition;
   g) fill the feed delivery device with the first amount and said part of the remaining filling amount and to
   h) distribute the first amount and said part to the first feeding location and the second feeding location respectively.

In an embodiment, the feeding system comprises a measurement system configured to determine which feeding locations have a feed requirement. This can be done by providing a rest feed sensor which can measure rest feed by weight sensors in connection to a feeding location, or by feed height measuring sensor in connection to a feeding location or in connection to a feed delivery device, by 3D camera in connection to a feeding location or in connection to a feed delivery device, or other suitable sensor devices in connection to a feeding location or in connection to a feed delivery device or even by a person taking note of the remaining feed at the feeding locations. The data gathered by the measurements may be compared by a control system programmed to execute the comparison with a pre-determined threshold value, the outcome may be used to determine if a feed is required to be distributed to the feeding location where the feed is measured.

The sensor of the measurement system may be provided on the feed delivery device, such that when the device moves along said feeding locations, it measures the amount of feed present there. In an embodiment, the measurement system carries out a rest feed measurement to determine the amount of feed present at a feeding location. The rest feed measurement may provide an average feed height at the feeding location, preferably after sweeping the feed to get a reproducible rest feed measurement.

In an embodiment, the feed delivery device comprises a mixing device for mixing feed. Alternatively, the mixing device may be provided separately from the feed delivery device, wherein for instance the mixing device after mixing the feed fills the feed delivery device.

In an embodiment, the feed delivery device is a autonomous, mobile device. It can be a feed wagon moving a long a rail. Preferably the autonomous, mobile device is self propelled. More preferably the autonomous, mobile self propelled device, can autonomously follow a route along the feed locations.

In an embodiment, the control system comprises a first control unit associated with the feed delivery device and a second control unit associated with the feed preparation device, wherein the first control unit is configured to carry out steps a) to g), and to place a feed order at the second control unit for a determined amount of feed of a particular feed composition, and wherein the second control unit is configured to prepare and fill the feed delivery device in accordance with the received feed order, i.e. in accordance with step h).

In an embodiment, the feed delivery device comprises a weighing device to determine a sub-amount received from the feed preparation device, wherein the first control unit based on the determined sub-amount determines whether an additional sub-amount is required and communicates this to the second control unit if necessary. If an additional sub-amount is required, the second control unit will then control the feed preparation device to fill the feed delivery device with the additional sub-amount.

Alternatively, the feed preparation device comprises such a weighing device and preparing the required sub-amount is done under control of the second control unit only, hence, no additional communication with the feed delivery device is required.

In an embodiment, the feed delivery device comprises a door allowing feed to be dispensed, which door extends away from the feed delivery device when at least partially opened. The control system is then preferably configured to combine only feeding locations in a single feeding round which are in a same group stored in the control system based on obstacles along the route that may interfere with an opened or partially opened door of the feed delivery device.

The invention will now be described in a non-limiting way by reference to the accompanying FIG. 1 which schematically depicts a plan view of a dairy farm.

FIG. 1 depicts schematically a farm comprising in this example two barns 1a, 1b to accommodate animals, i.e. cows 3. Only some cows 3 are shown in FIG. 1, but it will be clear that the barns 1a, 1b may accommodate more animals. To feed the cows 3, a feeding system is provided comprising in this embodiment a feed wagon 5 as feed delivery device to transport feed between a feed loading location, i.e. a loading area 7 and feeding locations 9a-9f near the cows 3. The feed system includes a control unit (not shown in the figures) which is in use, determines which feeding locations have a feed requirement;
   determines a respective feed distributing priority for the feeding locations having a feed requirement, and selects as a first feeding location to be provided with feed the feeding location having the highest priority; and
   determines a first feed composition and a first amount to be delivered to the first feeding location,
   determines a maximum filling amount of the feed delivery device for the first feed composition;
   determines a remaining filling amount for the first feed by subtracting the first amount from the maximum filling amount;
   apportions at least a part of the remaining filling amount to a second feeding location having a feed requirement of the first feed composition;
   controls the feed delivery device to be filled with the first amount and said part of the remaining filling amount and to
   distribute the first amount and said part to the first feeding location and the second feeding location respectively.

In the embodiment of FIG. 1, the feed delivery device is a feed wagon 5, which is filled by with the first amount by a feed preparation device 11. The feed preparation device 11 is positioned together with the loading area 7 and a feed storage location 13 in a building 15. The feed preparation device is configured to transport feed ingredients from the feed storage location to the loading area, in this case by a feed gripper moving along a rail 12, when it receives a feed order from control unit to fill the feed wagon with the ordered composition first composition of feed.

The feed preparation device and the feed wagon may both be autonomous devices controlled by respective control units that communicate with each other, but that function independently. However, the feed preparation device and feed wagon may also be controlled by a common, central, control system.

In order to keep the feed fresh or as fresh as possible, some of the feed is initially stored in a long term storage like a silo 17 and subsequently transported, e.g. as bales, to the feed storage location in the building 15.

In the shown embodiment, each barn 1a, 1b has three fenced areas, respectively fenced areas 2a, 2b, 2c for barn 1a and fenced areas 4a, 4b, 4c for barn 1b where animals can be held in groups separate from the other groups. The animals on a dairy farm may be divided into one or more groups, like milking cows, high and low yielders, heifers, dry cows, etc., each group requiring a different feed composition, i.e. mixed feed ration.

Each fenced area has an associated feeding location 9a-9f where feed is provided for the animals to eat. The feeding locations are located outside the fenced areas so that animals have to reach over or through a respective fence to get to the feed at the feeding location. This creates a safe area for the feed wagon to move along the feeding locations without interfering with the animals. The feeding locations may alternatively be located inside the fenced areas, in which case safety may be maintained by using an overhead guiding system along which a feed delivery device can be transported above the feeding locations without interfering with the animals.

In this embodiment, the feed wagon includes a mixing device within the mixing and feeding device to mix the feed. However, this mixing device may also be provided separately as a stationary feed mixing device, or even as part of the feed preparation device or be absent at all. The feed preparation device may comprise a gripper to grab feed in the feed storage location and release the grabbed feed at the loading area (feed loading location) into the feed wagon or feed mixing device. Alternatively, other types of feed preparation devices may be provided, which do not have a feed grabber, but include feed bunkers or silo's which transport feed to an end which end of the bunker where a feed cutter is provided, to cut sub-amounts of feed, which sub-amounts are then transported to a feed mixer to prepare a feed composition and subsequently to a feed delivery device, or directly to a feed delivery device which includes a mixing device to mix the feed.

Table 1 indicates possible feeding settings in the feed system, for the fenced areas and corresponding feed locations. The feed composition is simplified by a referring to a letter, so that it can easily be seen that feeding location 9a, 9b and 9e require feed of composition A which is different from feed composition B required at feeding location 9c, 9d and 9f. The precise composition is not relevant for the invention. Feed composition may alternatively be referred to as ration of mixed feed ration.

The amount of feed present at a feeding location is in this embodiment represented by the average height of feed in centimeters at a feeding location after it has been swept. Sweeping is usually performed by either the feed wagon itself, a separate sweeping robot or personnel. The average height of feed may be measured by a suitable measuring system in connection to the feeding locations, or by a suitable measuring system in connection to the feed wagon itself. Such measuring systems for height may include a 3D-camera, a laser or the like. The threshold is the minimum average height that is accepted without having to deliver new feed. When the average height at a feeding location gets below the threshold, a predetermined amount will be delivered by the feed wagon, which amount is expressed in kilograms and distributed to the feeding location.

TABLE 1 exemplary settings for fenced areas

| Fenced area | Feeding location | Feed composition | Amount (kg) | Threshold (cm) |
| --- | --- | --- | --- | --- |
| 2a | 9a | A | 500 | 10 |
| 2b | 9b | A | 300 | 5 |
| 2c | 9c | B | 200 | 15 |
| 4a | 9d | B | 150 | 15 |
| 4b | 9e | A | 200 | 10 |
| 4c | 9f | B | 150 | 10 |

FIG. 1 further shows in dashed lines a route 6 that may be taken by the feed wagon during a run/feeding round past all feeding locations. In this embodiment, when the feed wagon has been filled at the feed loading location 7 it will first go to barn 1a, where it passes feeding locations 9a, 9b and 9c. It then moves to barn 1b and passes feeding locations 9d, 9e and 9f. In this embodiment, every time the feed wagon makes a feeding round feed may be swept at each feeding location and the height of the feed is measured.

An outcome of the data of a feeding round may be that none of the feeding locations have a feeding requirement. Hence, no next feeding round will be planned based on delivering feed. However, the system may be programmed, that in such a case, the feed wagon makes a next run past all feeding locations after a pre-determined time, to determine whether there are feeding locations having a feed requirement. Alternatively, the system may be programmed to have the feed wagon make regular runs past all feeding locations.

Table 2 comprises example measurement results of rest feed at the feeding locations.

TABLE 2 rest feed measurement results

| Feeding location | Feed composition | Amount (kg) | Threshold (cm) | Average height measurement (cm) |
| --- | --- | --- | --- | --- |
| 9a | A | 500 | 10 | 6 |
| 9b | A | 300 | 5 | 4 |
| 9c | B | 200 | 15 | 18 |
| 9d | B | 150 | 15 | 13 |
| 9e | A | 200 | 10 | 4 |
| 9f | B | 100 | 10 | 11 |

By comparing the rest feed measurement in the form of the average height measurement of the feed at the feeding locations with the corresponding threshold it can be seen that feeding locations 9c and 9f have enough feed and thus do not require fresh new feed. On the other hand, feeding locations 9a, 9b, 9d and 9e require feed. To determine a priority, the differences between the average height measurement and the corresponding thresholds are determined. This results in the following differences:

Feeding location 9a: 4 cm
Feeding location 9b: 1 cm
Feeding location 9d: 2 cm
Feeding location 9e: 6 cm Hence, feeding location 9e has the highest priority as the difference is the largest, followed by respectively feeding location 9a, 9d and 9b which has the lowest priority. Feeding location 9a with the highest priority requires 200 kg of feed composition A. In prior art systems, the feed system would place an order of 200 kg of feed composition A and control the feed wagon and the feed preparation device to load the feed wagon at the feed loading area 7 with 200 kg of feed composition A and drive along the route 6 and deliver the 200 kg of feed composition A to feeding location 9e. After which the process of determining which feeding location requires new feed the most is repeated.

However, the method according to the invention first determines whether there are further feeding locations requiring feed composition A. In the example above feeding locations 9a and 9b also require feed composition A, respectively 500 and 300 kg.

Suppose the maximum filling amount of the feed wagon for feed composition A in this embodiment is 500 kg. This means that when feeding location 9e is serviced, there is still room in the feed wagon of 300 kg. This 300 kg is referred to as the remaining filling amount. Combinations of the feeding locations will then be investigated in descending order of priority. Hence, first a combination of the feeding location with the highest priority and the feeding location which has the next highest priority, in this example feeding location 9a, will be investigated resulting in an additional demand of 500 kg of feed which is above the remaining filling amount. Hence, this combination will be rejected and the next combination of feeding locations 9e and 9b will be investigated. This results in an additional feed order of 300 kg which is equal to the remaining filling amount. Hence, updating the remaining filling amount results in an updated remaining filling amount of 0 kg. This means that there is no room left to service another further feeding location in this feeding round and evaluation of the other feeding locations may be skipped. If the updated remaining filling amount was still above a certain value, evaluation could continue to try to find another feeding location that can be serviced during the next feeding round.

That means that in this example feeding location 9b will be combined with feeding location 9e and thus the mixing and robot will order 500 kg of feed composition A instead of 200 kg and service both feeding locations during the next feeding round past the feeding locations. Due to the larger amount of feed in the feed wagon the mixing properties are improved as well as the difference between actually received and delivered feed composition and requested feed composition A thereby improving the quality of the feed at both feeding location 9e and 9b. In an embodiment, the feeding locations 9a-9f are divided into two groups due to an obstacle along route 6 introducing a risk of interference between the feed wagon and the obstacle when distributing the feed is not finished yet. This feed wagon may for instance comprise a door that is slid open vertically. When the door is open or not completely closed it may extend above the feed wagon. When distributing the feed to more then one feeding location, the door will be closed in between feeding locations, but there is a risk that feed gets trapped between the door and the door opening, so that the door is not completely closed and still extends above the feed wagon. An obstacle, for instance the access opening of the barns 1a and 1b, may then interfere with the not completely closed door. Hence, the access openings of the barns divide the feeding locations into a first group 9a, 9b, 9c and a second group 9d, 9e, 9f. Feeding locations may then only be combined when they are in the same group in order to prevent the feed wagon from interfering with the obstacle as all distributing actions take place within the group and the door of the feed wagon is able to completely close before reaching the obstacle.

Other types of obstacles may be cables, lamps, or in case of doors opening sideways, curves which cannot be taken due to the added with of the feed wagon.

The method according to the invention reduces the difference between actually delivered feed composition and required feed composition. To further improve the feed quality provided to the animals, a difference between actually delivered feed composition and required feed composition can be compensated by changing the feed composition for the next time the feeding location is fed. However, as feeding locations are combined and the manner in which feeding locations are combined is not always the same, compensation is not as straight forward as in the prior art method where only one feeding location is provided with new feed at the same time.

When multiple feeding locations are provided with new feed in the same round, compensation may still be applied, but the changed feed composition is then preferably based on the required compensation for the feeding location receiving the biggest part of the feed in the feed wagon.

In the abovementioned example, priority is assigned based on a rest feed measurement. However, priority may also be assigned based on a distribution plan and amount of time that has passed since a previous feeding delivery action at a particular feeding location.

The invention claimed is:

1. A method for automatically distributing feed over a plurality of separate feeding locations using a feed delivery device, said method comprising the following steps:
   a) determining which of the plurality of separate feeding locations have a feed requirement, respectively;
   b) determining a respective feed distributing priority for the feeding locations having a respective feed requirement and determining a feeding location having the highest feed distributing priority, wherein a first feeding location is the feeding location having the highest feed distributing priority;
   c) determining a first feed composition and a first amount to be delivered to the first feeding location;
   d) determining a maximum filling amount of the feed delivery device for the first feed composition;
   e) determining a remaining filling amount of the feed delivery device for the first feed composition by subtracting the first amount from the maximum filling amount;
   f) apportioning at least a part of the remaining filling amount to a second feeding location having a respective feed requirement of the first feed composition;
   g) filling the feed delivery device with the first amount and said part of the remaining filling amount; and
   h) distributing the first amount and said part to the first feeding location and the second feeding location, respectively.

2. The method according to claim 1, wherein the apportioning step (f) comprises the following steps:
   f1) selecting, as the second feeding location, a feeding location having a feed requirement of a second amount, which second amount is less than or equal to the remaining filling amount; and
   f2) setting said part of the remaining filling amount to be the second amount.

3. The method according to claim 2, the apportioning step (f) further comprising the following step to be carried out after step f2):

f3) updating the remaining filling amount to an updated remaining filling amount by subtracting the second amount from the remaining filling amount, and wherein the apportioning step (f) is repeated for further feeding locations having a further feed requirement of the first feed composition, with further amounts and further updated remaining filling amounts, until there are no further feeding locations left which require a further amount of feed that is equal to or less than the part of the further updated remaining filling amount.

4. The method according to claim 3, wherein selecting the second or further feeding locations is done in descending order of feed distributing priority.

5. The method according to claim 1, wherein the step of determining which of the plurality of separate feeding locations have a feed requirement, respectively, is based on a rest feed measurement, which is representative for an amount of feed remaining at the respective feeding locations.

6. The method according to claim 5, wherein the step of determining which of the plurality of separate feeding locations have a feed requirement, respectively, comprises comparing the rest feed measurement with a threshold value representative for a minimum amount of feed, wherein the respective feeding locations are determined to have a feed requirement, respectively, when the rest feed measurement for said feeding location is below the threshold value corresponding to said feeding location.

7. The method according to claim 6, wherein the step of determining the respective feed distributing priority for the feeding locations having a respective feed requirement comprises determining a difference between the respective rest feed measurement and the corresponding threshold value for each feeding location having a respective feed requirement, and wherein the first feeding location is the feeding location having the largest difference.

8. The method according to claim 5, wherein the step of determining the respective feed distributing priority for the feeding locations having a respective feed requirement is based on the rest feed measurement.

9. The method according to claim 1, wherein the feed composition of the feed used to fill the feed delivery device is adapted based on a difference between the feed composition delivered earlier to a compensation feeding location and a desired feed composition to be delivered to the compensation feeding location, wherein the compensation feeding location is a feeding location to receive a largest amount of feed from the feed delivery device, and wherein an adaptation of the feed composition is intended to compensate for said difference.

10. The method according to claim 1, wherein the feed delivery device moves along a route along all of the plurality of separate feeding locations when distributing the feed, wherein the feeding locations are grouped depending on obstacles present along the route that may interfere with the feed delivery device during distributing the feed, and wherein in step f), one of the plurality of separate feeding locations, which belongs to the same group as the first feeding location, is determined as the second feeding location.

11. A feeding system for automatically distributing feed over a plurality of separate feeding locations, comprising:
a feed delivery device;
a feed storage location;
a feed loading location;
a feed preparation device; and
a controller,
wherein the feed delivery device is configured to automatically deliver feed from the feed loading location to at least one of the plurality of separate feeding locations,
wherein the feed preparation device is configured to deliver feed from the feed storage location to the feed loading location to fill the feed delivery device, and
wherein the controller is configured to:
a) determine which of the plurality of separate feeding locations have a feed requirement, respectively;
b) determine a respective feed distributing priority for the feeding locations having a respective feed requirement and determine a feeding location having the highest feed distributing priority, wherein a first feeding location is the feeding location having the highest feed distributing priority;
c) determine a first feed composition and a first amount to be delivered to the first feeding location;
d) determine a maximum filling amount of the feed delivery device for the first feed composition;
e) determine a remaining filling amount of the feed delivery device for the first feed composition by subtracting the first amount from the maximum filling amount;
f) apportion at least a part of the remaining filling amount to a second feeding location having a respective feed requirement of the first feed composition;
g) fill the feed delivery device with the first amount and said part of the remaining filling amount; and
h) distribute the first amount and said part to the first feeding location and the second feeding location, respectively.

12. The feeding system according to claim 11, wherein the controller comprises a measurement system configured to determine which of the plurality of separate feeding locations have a feed requirement, respectively.

13. The feeding system according to claim 11, further comprising a mixing device for mixing feed.

14. The feeding system according to claim 13, wherein the mixing device is provided as part of the feed delivery device.

15. The feeding system according to claim 11, wherein the feed delivery device comprises a door allowing feed to be dispensed, which door extends away from the feed delivery device when the door is at least partially opened, and wherein the controller is configured to combine only feeding locations in a single feeding round, which are in a same group stored in the controller based on obstacles along a route that may interfere with the door when the door is opened or partially opened.

16. The feeding system according to claim 11, wherein the controller is further configured to:
select, as the second feeding location, a feeding location having a feed requirement of a second amount, which second amount is less than or equal to the remaining filling amount; and
set said part of the remaining filling amount to be the second amount.

17. The feeding system according to claim 16, wherein the controller is further configured to, after setting said part of the remaining filling amount to be the second amount:
update the remaining filling amount to an updated remaining filling amount by subtracting the second amount from the remaining filling amount, and wherein the controller is further configured to repeat apportioning for further feeding locations having a further feed requirement of the first feed composition, with further amounts and further updated remaining filling amounts, until there are no further feeding locations left which require a further amount of feed that is equal to or less than the part of the further updated remaining filling amount.

18. The feeding system according to claim 17, wherein selecting the second or further feeding locations is done in descending order of feed distributing priority.

19. The feeding system according to claim 11, wherein the controller is configured to determine which of the plurality of separate feeding locations have a feed requirement, respectively, based on a rest feed measurement, which is representative for an amount of feed remaining at the respective feeding locations.

20. The feeding system according to claim 19, wherein the controller is configured to determine which of the plurality of separate feeding locations have a feed requirement, respectively, by comparing the rest feed measurement with a threshold value representative for a minimum amount of feed, wherein the controller is configured to determine the feeding locations to have a feed requirement, respectively, when the rest feed measurement for said feeding location is below the threshold value corresponding to said feeding location.

21. The feeding system according to claim 20, wherein the controller is configured to determine the respective feed distributing priority for the feeding locations having a respective feed requirement by determining a difference between the respective rest feed measurement and the corresponding threshold value for each feeding location having a respective feed requirement, and wherein the first feeding location is the feeding location having the largest difference.

22. The feeding system according to claim 19, wherein the controller is configured to determine the respective feed distributing priority for the feeding locations having a respective feed requirement based on the rest feed measurement.

23. The feeding system according to claim 11, wherein the feed composition of the feed used to fill the feed delivery device is adapted based on a difference between the feed composition delivered earlier to a compensation feeding location and a desired feed composition to be delivered to the compensation feeding location, wherein the compensation feeding location is the location to receive a largest amount of feed from the feed delivery device, and wherein an adaptation of the feed composition is intended to compensate for said difference.

24. The feeding system according to claim 11, wherein the feed delivery device is configured to move along a route along all of the plurality of separate feeding locations when distributing the feed,
wherein the feeding locations are grouped depending on obstacles present along the route that may interfere with the feed delivery device during distributing the feed, and
wherein the controller is configured to, when apportioning at least a part of the remaining filling amount to the second feeding location having the respective feed requirement of the first feed composition, determine one of the plurality of separate feeding locations as the second feeding location which belongs to the same group as the first feeding location.

* * * * *